United States Patent
Newell

(10) Patent No.: US 9,953,166 B2
(45) Date of Patent: Apr. 24, 2018

(54) METHOD FOR SECURELY BOOTING TARGET PROCESSOR IN TARGET SYSTEM USING A SECURE ROOT OF TRUST TO VERIFY A RETURNED MESSAGE AUTHENTICATION CODE RECREATED BY THE TARGET PROCESSOR

(71) Applicant: Microsemi SoC Corporation, San Jose, CA (US)

(72) Inventor: G. Richard Newell, Tracy, CA (US)

(73) Assignee: Microsemi SoC Corporation, San Jose, CA (US)

( * ) Notice: Subject to any disclaimer, the term of this patent is extended or adjusted under 35 U.S.C. 154(b) by 608 days.

(21) Appl. No.: 14/322,953

(22) Filed: Jul. 3, 2014

(65) Prior Publication Data

US 2015/0012737 A1 Jan. 8, 2015

Related U.S. Application Data

(60) Provisional application No. 61/842,985, filed on Jul. 4, 2013.

(51) Int. Cl.
*G06F 9/00* (2006.01)
*G06F 15/177* (2006.01)
*G06F 21/57* (2013.01)
*G06F 21/44* (2013.01)

(52) U.S. Cl.
CPC .......... *G06F 21/575* (2013.01); *G06F 21/44* (2013.01); *G06F 2221/2103* (2013.01)

(58) Field of Classification Search
CPC . G06F 21/44; G06F 21/575; G06F 2221/2103
See application file for complete search history.

(56) References Cited

U.S. PATENT DOCUMENTS

| | | | |
|---|---|---|---|
| 8,949,586 B2 | 2/2015 | Shroff et al. | |
| 2003/0172268 A1* | 9/2003 | Walmsley | H04L 9/3271 713/168 |
| 2006/0107320 A1* | 5/2006 | Bhatt | G06F 21/575 726/22 |
| 2007/0107056 A1* | 5/2007 | Frank | G06F 11/0751 726/22 |

(Continued)

*Primary Examiner* — Thomas Lee
*Assistant Examiner* — Zhipeng Wang
(74) *Attorney, Agent, or Firm* — Glass Associates; Kenneth D'Alessandro; Kenneth Glass

(57) ABSTRACT

A method for securely booting a target processor in a target system from a secure root of trust includes computing a message authentication code from boot code to be provided to the target processor, including an obfuscated algorithm for recreating the message authentication code in the target processor, serving the boot code to the target processor, executing the boot code to recreate the message authentication code in the target processor, serving the message authentication code back to the root of trust, comparing the returned message authentication code with the message authentication code generated in the root of trust, continuing execution of the boot code data if the returned message authentication code matches the message authentication code, and applying at least one penalty to the target system if the returned message authentication code does not match the message authentication code generated in the root of trust.

18 Claims, 5 Drawing Sheets

(56) References Cited

U.S. PATENT DOCUMENTS

| | | | | |
|---|---|---|---|---|
| 2008/0022108 A1* | 1/2008 | Brannock | ............... | G06F 21/10 |
| | | | | 713/176 |
| 2009/0144559 A1* | 6/2009 | Lee | ....................... | G06F 21/575 |
| | | | | 713/189 |
| 2010/0082987 A1* | 4/2010 | Thom | ..................... | G06F 21/34 |
| | | | | 713/171 |
| 2011/0099361 A1* | 4/2011 | Shah | ..................... | H04W 12/10 |
| | | | | 713/2 |
| 2012/0210115 A1* | 8/2012 | Park | ..................... | H04L 9/3242 |
| | | | | 713/2 |
| 2012/0210124 A1* | 8/2012 | Lieber | ................... | H04L 9/0825 |
| | | | | 713/158 |
| 2012/0221864 A1* | 8/2012 | Ciet | ..................... | G06F 21/577 |
| | | | | 713/190 |
| 2012/0311314 A1* | 12/2012 | Cumming | ............. | G06F 21/575 |
| | | | | 713/2 |

* cited by examiner

METHOD FOR SECURELY BOOTING TARGET PROCESSOR IN TARGET SYSTEM USING A SECURE ROOT OF TRUST TO VERIFY A RETURNED MESSAGE AUTHENTICATION CODE RECREATED BY THE TARGET PROCESSOR

CROSS REFERENCE TO RELATED APPLICATION

This application claims priority from U.S. Provisional Patent Application No. 61/842,985, filed on Jul. 4, 2013, which is incorporated herein by reference in its entirety.

BACKGROUND OF THE INVENTION

Field of the Invention

The present invention relates to processors. More particularly, the present invention relates to providing a level of assurance that a processor is executing trusted firmware/software, particularly in integrated circuit processors that have insufficient built-in protection.

Description of Related Art

Hacking of embedded processor based systems is on the rise. It is easy to obtain many embedded products. Tools for hacking such systems are readily available from hacker websites. Improved security measures are required to counter these increasingly sophisticated attacks.

In the context of this invention, "processor" refers to an electronic circuit that is programmed or configured with object code (for example, a compiled program including any associated data) or a bitstream (for example, a compiled logic design including any associated data) that is loaded into the circuit that customizes the run-time operation of the circuit. Some types of processors envisioned for use in the invention include, without limitation, single or multi-chip microprocessors (MPUs), microcontrollers (MCUs), digital signal processors (DSPs), graphics processors (GPUs), network processors (NPUs), field programmable gate arrays (FPGAs), system-on-chip (SoC) integrated circuits, or any combination of these such as SoC FPGAs and multi-processor integrated circuits and systems. "Code" is subsequently used to refer to the object code, bitstreams, or associated data that is loaded into the processor during the initialization and start-up of the circuit, commonly referred to as the boot-up phase. Code may also be loaded in later phases, particularly if the entire program cannot fit into the processor at one time due to capacity limitations of the processor.

The cornerstone of embedded system security is to ensure that only authorized processor code is loaded and executed. System security begins with initial power-on processor boot code. The process of guaranteeing the execution of authentic code is commonly called "Secure Boot". If the initial hardware and boot code can be trusted, then this trust can be extended to code loaded and executed later by using cryptographic techniques such as digital code signing. No single technique will prevent compromise; security must be built up in layers upon a secure foundation. The secure foundation is the Root of trust, and starts with secure hardware.

Many unsecured processors import all instruction code from off-chip, beginning from the first instruction executed. For example, they may request the data in address zero of an off-chip non-volatile memory, like a flash PROM, and use that as the first instruction to be executed. If it is not a branch instruction, the instruction counter automatically increments and the next word fetched and executed, ad infinitum. No authentication on the code that is fetched is done. Obviously, all an adversary has to do in this case to subvert the process is to change the PROM having the desired firmware to one containing his malicious code, or to intercept the code at the circuit-board level and replace the legitimate code with his malicious code. In some cases, an adversary may attack an embedded processor system over a network, and then by "re-flashing" the system (i.e., updating the contents of the PROM), he can make his exploit persistent. Secure Boot can detect such a change in the boot PROM the next time the system is reset and rebooted, thus providing added security even against network-based attacks.

FIG. 1 is a flow diagram depicting a typical prior-art unsecure boot sequence 10. In Phase 0 at reference numeral 12, an on-chip boot ROM fetches an application-specific secondary boot loader from external memory. Phase 1 is an application-specific boot loader shown at reference numeral 14. The BIOS, to the extent that it exists for a given implementation, is then loaded in Phase 2 as shown at reference numeral 16. The operating system is then loaded in Phase 3 as shown at reference numeral 18. Finally, in Phase 4, applications are loaded as shown at reference numeral 20.

Execution from the first phase, Phase 0, to Phase 4 is non-stop. This non-stop execution is unsecure because during execution of any of Phases 1 through 4, a hacker may substitute unauthorized code in place of the code that is meant to be executed by the processor, and it will be executed by the processor without being checked for authenticity.

Securely booting non-secure processors is challenging when the target processor has no built-in security capabilities. There is no root of trust capability in such systems. Customers in many market segments, such as telecom, military, industrial, medical, and energy, face this issue. Smaller microprocessors/microcontrollers are often located in peripheral or remote subsystems. These processors typically have no security capability and are especially vulnerable to attack.

FIG. 2 is a flow diagram depicting a prior-art secure boot sequence. In FIG. 2 the system is initialized from rest with trusted code. Phase 0 boot is performed by an immutable boot loader. The initial root of trust in this process stems from immutable trusted hardware.

In the boot sequence depicted in FIG. 2, validation of each stage is performed by the prior stage. The code for Phases 1 through n is validated by an already-trusted system before execution is transferred to it. This process establishes a chain of trust all the way to the top application layer.

Some processors may nominally include a secure boot capability, such as depicted in FIG. 2, where off-chip code is authenticated when loaded and before execution, but the capability may not meet the (higher) security demands of a particular application. For example, the built-in secure boot capability may be vulnerable to having its secret keys extracted using a side channel analysis (SCA) technique such as simple power analysis (SPA), differential power analysis (DPA), or differential electro-magnetic analysis (DEMA). Especially in fielded or remote systems where the adversary may gain physical proximity to the system, threats, such as these, may be unacceptable to the system designer because if the adversary can learn the values of the secret keys he can defeat the secure boot implementation by making his own malicious code appear authentic to the processor, which will be tricked into executing the forged code.

SUMMARY OF THE INVENTION

If, instead of being stored in a boot PROM external to the processor integrated circuit, the initial boot code can be stored inside a more secure chip such as a secure SoC FPGA. A non-limiting example of a secure chip is a SmartFusion®2 FPGA, available from Microsemi SoC Corp., Aliso Viejo, Calif. With a secure chip storing the initial boot code, it becomes more difficult to overwrite or tamper with. This secure chip is the foundation for the root of trust according to the present invention. The secure chip can then control the reset of the target processor, and when it releases the reset (shortly after power-up, for example), the target processor will request the instructions from its external memory interface. Instead of using a conventional memory chip, the memory interface is advantageously routed to a secure chip that emulates the external memory and supplies the boot code to the target processor. This alone improves the security. The terms "secure chip", "root of trust", and "secure root of trust" are used interchangeably herein.

In an exemplary embodiment, the boot code served up contains an algorithm whereby, after sufficient code has been transferred to the target processor internal memory, the integrity and authenticity of the now-local code is measured (i.e., verified) and proven to the root of trust in the form of a secure chip (e.g., the SmartFusion®2 SoC FPGA) to have integrity (i.e., to be unchanged) and authentic (from the authorized source). This is done using an adaptation of a cryptographic challenge-response protocol. The secure chip sends the target processor (e.g., as part of the code upload) an unpredictable nonce (number used only once, such as a large enough random number), and the target processor has to respond correctly, proving it has loaded and is executing exactly the delivered code and has the current nonce. To make this response hard to forge, a secret is used in the calculation of the response. If this response is correct, the secure chip is assured that the process has not been subverted, and it allows the target processor to execute the now-trusted code, proceeding (typically) with a next-stage boot process. If the response is wrong, the secure chip applies the penalties that are available to it to prevent further exploitation by the adversary that is then assumed to be tampering with the process.

The nonce ensures that the correct response is different on each boot attempt, thus preventing a simple replay attack where the adversary would record the correct response from a successful boot, and then replay the response during a boot attempt which has been tampered with in order to trick the secure chip into believing the process is still secure. One difficulty is that, for processors with no intrinsic support for secure boot, all the initial code that is loaded and executed is assumed to be visible to an adversary, and, is thus, subject to a monitoring attack where the adversary observes the code as it is loaded; and most likely the code can also be tampered with, such as where the adversary interrupts the transmission of the valid code into the target processor, and substitutes his own code in its place in what is called a man-in-the-middle attack. Providing a level of assurance that a processor is executing trusted code (e.g., firmware/software or logic configuration), particularly in integrated circuit processors that have insufficient built-in protection, is essential for the secure operation of any processor, for if it is executing code supplied by an adversary, secure operation is not possible.

The process providing this assurance is often called "secure boot", and generally in the prior art requires certain features to be built into the same chip as the processor itself. For instance, there generally has to be some immutable boot code (e.g., in on-chip metal-mask ROM) or a state machine built into the processor chip that checks the authenticity of any code subsequently loaded from outside the chip. This checking is typically done cryptographically, and in addition to the immutable boot code requires either an immutable public key which can be used to check a digital signature affixed to the code being loaded, or an immutable and secret symmetric key which is used to check a message authentication code (MAC) affixed to the code being loaded, or an immutable digest of the authentic code.

The present invention allows one to achieve a relatively high level of assurance in processors that do not have such built-in secure boot features as described above. For instance, many digital signal processor (DSP) ICs do not include any secure boot features, nor do many embedded processors, and even quite a few application processors do not yet support secure boot intrinsically.

While the trend is for more recent processor chips to support secure boot, it is expected that many will not, especially in certain classes such as DSPs where the demand for such security may be in niches, where the mainstream is not interested in paying anything extra for this level of security. However, in some applications where a DSP may be used, for example, an exportable military radar system, secure boot may be essential.

The present invention entails using an external root of trust chip (such as SmartFusion®2) to provide the required assurance that the target processor is executing trusted code. If the root of trust chip detects that the process has been tampered with, then it provides a penalty that makes further tampering or exploitation more difficult for the adversary, such as applying reset to the target processor, shutting down the power on the circuit board, disabling other communication, erasing critical security parameters or variables from memory, halting critical computations, stopping clocks, or other known disruptive actions. With target processors that nominally support a secure boot process using built-in features but where there are unwanted vulnerabilities such as a vulnerability to key extraction using side-channel analysis, the invention may be used to enhance the security of the built-in secure boot by implementing secure boot in a way that no longer exhibits the unwanted vulnerabilities, thus allowing the target processor to be used in applications, such as fielded or remote applications, where resistance to side-channel analysis is required.

DESCRIPTION OF THE INVENTION

Figure 1:
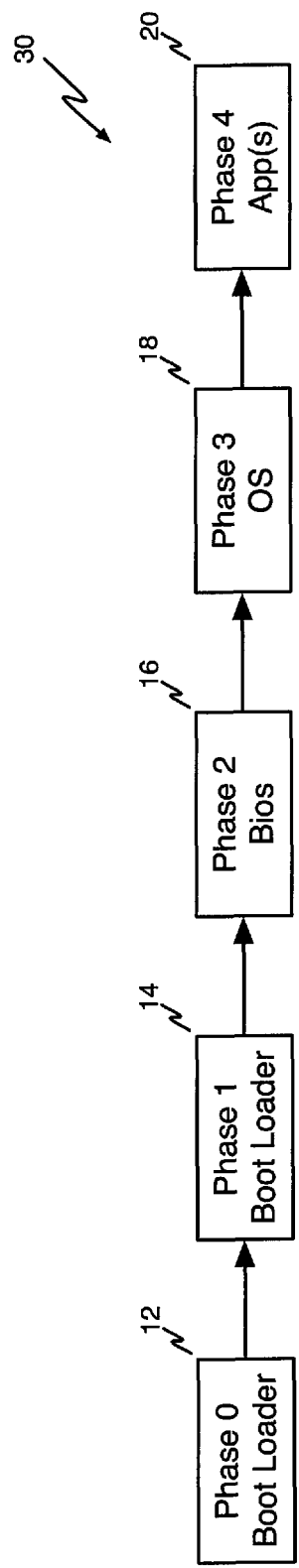
FIG. 1 is a flow diagram depicting a prior-art unsecure boot sequence.
Figure 2:
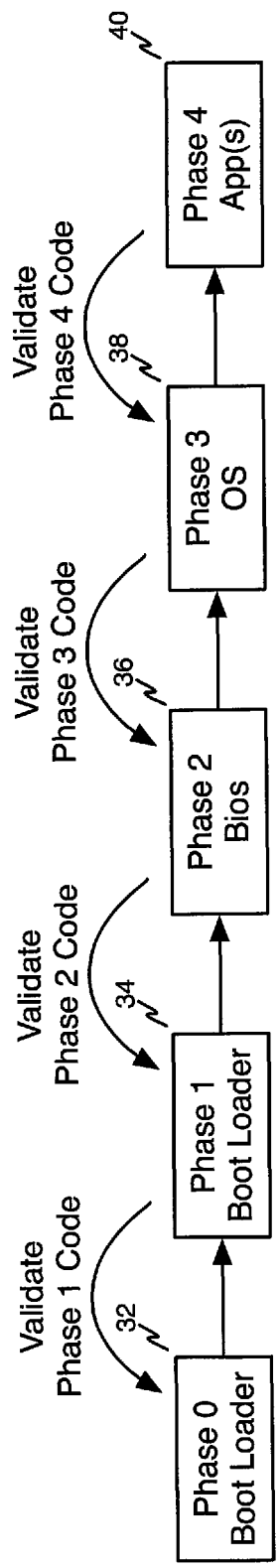
FIG. 2 is a flow diagram depicting a prior-art secure boot sequence.

In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

Booting processors from known trusted code is a prerequisite for the secure operation of embedded systems. If the initial hardware and boot code can be trusted, then this trust can be extended to code loaded and executed later by using cryptographic techniques such as digital code signing. No single technique will prevent compromise; security must be built up in layers upon a secure foundation.

The secure foundation is the root of trust. A hardware root of trust is essential to implement secure boot of processors. Root of trust is an entity that can be trusted to behave in an expected manner. The root of trust supports system verification, software and data integrity, and keeps keys and critical data confidential. Its processes are immutable and resistant to attack, and it works in conjunction with other system elements to ensure system security. A root of trust is the foundation upon which all other security layers are created and trusted.

According to one aspect of the present invention, the root of trust in the form of a secure chip (a secure SoC FPGA in the non-limiting exemplary embodiment described herein) emulates an external boot memory so that it appears to the target processor as an SPI flash boot device and downloads the Phase-0 boot code to the target processor. The boot code loads itself to the general purpose SRAM or cache memory of the target processor. The code executes on the processor performing an integrity check by computing a CBC-MAC (Message Authentication Code) of the SRAM or cache contents. The CBC-MAC needs to be correct and is transmitted back to the SoC FPGA for validation. Penalties are imposed if the integrity/authentication check fails.

In some embodiments of the inventionm the secure source and the target processor are circuits in the same system, and in some embodiments they are on the same or different circuit boards or in different systems across a network.

According to variations of the present invention, the boot process can be time bounded in order to better detect tampering, or the uploaded code can include a random number or other unpredictable nonce as data, so that the correct result varies on every power cycle to prevent replay attacks. The boot process can also include hardware binding of the secure root of trust to the target processor to prevent cloning/spoofing or relay-type attacks. Alternative or additional methods of determining "freshness" (versus a nonce concatenated with the code) may be used, for example, using a different key for each boot attempt. Alternative methods of key establishment are well known to practitioners of cryptographic protocols that may be used in place of the RSA-based method illustrated here.

According to the present invention, code validation can be performed during a multi-stage boot process using symmetric or asymmetric key cryptography techniques. Each stage of the boot process may use the same or a different method, and may rely on the same or different secret keys. With asymmetric techniques an inherently trusted public key, such as an RSA or ECC public key, is built into the Phase-0 boot loader. The Phase-1 code is digitally signed using the RSA or ECC private key. During Phase-0 the root of trust subsystem validates the digital signature of the Phase-1 code prior to its execution. The boot is aborted if the digital signature of the Phase-1 code is invalid. In an alternative symmetric key approach, the Phase-1 code may be tagged with a message authentication code (MAC) tag. During Phase-0 the root of trust subsystem validates the MAC tag of the Phase-1 code prior to its execution. The boot is aborted if the MAC tag of the Phase-1 code is invalid. Even a non-keyed approach is possible, where an immutable message digest (a.k.a. a secure hash) of the authentic code is compared to one calculated on the code being measured, with the code being executed only if the match is successful.

The immutability of the Public Key used in the root of trust signature process is critically important. Similarly, the immutability and the confidentiality of the symmetric key used in calculating the MAC tag is critically important if the alternative symmetric approach is used. The immutability of a secure hash, if used, is likewise essential. Safe operation can and should be confirmed by employing anti-tamper monitors that continuously test parameters, such as voltage, clocks, temperature, and intrusion. If secret keys are used for encryption, decryption or authentication, they should be protected against extraction from either the secure root of trust or the target processor hardware where they are used. Other secret values, such as intermediate calculations made during computation of the message authentication code, also need protection against extraction via side channel analysis. Countermeasures against side channel monitoring attacks (a.k.a. side channel analysis) that can be used in the present invention are well known to implementers of cryptographic algorithms. For examples, refer the proceedings of the annual international Cryptographic Hardware and Embedded Systems (CHES) conference, the annual Hardware Oriented Security and Trust (HOST) conference, or, for example, the numerous patents issued to Cryptography Research, Inc. on side channel analysis countermeasures. One advantage of using the present invention to provide for secure boot or confidentiality of code is that it provides an opportunity to implement these security services incorporating countermeasures to such side channel monitoring attacks in systems that do not currently have such protection.

According to one aspect of the present invention, response to an invalid digital signature or MAC tag triggers one or more penalty responses, such as asserting reset on the target processor, disabling I/O on the board, disrupting power to the board, and disrupting communications facilities or interfaces on the board.

According to one embodiment of the present invention, a secret key is transferred to the target processor in obfuscated form, using a hardware or software based cryptography security product employing techniques, such as whitebox cryptography, for example, WhiteboxCRYPTO™, available from the West Lafayette Division of Microsemi Corporation of West Lafayette, Ind. Whitebox cryptography techniques are well known in the art of cryptography. Use of such a technique helps defeat monitoring attacks, for even if the WhiteboxCRYPTO™ code is monitored, understanding what it does, how it works, or even what the key is, becomes a fairly difficult problem for the adversary that is unlikely to be solved in the time allotted. In the version of WhiteboxCRYPTO™ that implements the Advanced Encryption Standard (AES), the secret symmetric key is obfuscated by mixing it in with the AES algorithm itself in a way that is very difficult to reverse engineer, while the WhiteboxCRYPTO™ AES algorithm performs exactly the same as a conventional implementation of AES using that key, albeit with a performance penalty. Having the AES algorithm and a secret AES key available in the target processor makes it possible to compute a message authentication code (MAC)

using the well-known Cipher-Block Chaining MAC (CBC-MAC) algorithm, which can be based on AES.

AES-based CBC-MAC is but one possible algorithm for computing a message authentication code, and is especially convenient if a whitebox cryptography implementation of AES is available to the designer. However, the obfuscated message authentication algorithm chosen does not even have to rely on a known conventional key, so long as it functions as a MAC algorithm having the usual MAC properties, such as all the output bits depend on all the bits of the message input, and the output being difficult to forge, and etc., and where both the target processor and the secure root of trust can execute the chosen algorithm with identical results. An additional useful optional property includes being able to change the MAC algorithm (e.g., the effective key) synchronously between the target processor and the root of trust each time the boot protocol is run, as this can reduce the value to an adversary of reverse engineering the message authentication code algorithm in one run of the protocol if in all the subsequent runs some or all of the analysis has to be repeated due to the run-to-run changes. Another additional useful property is the ability to affect the output based on an additional secret key input, such as a device-specific key coming from a physically unclonable function (PUF), as this allows the hardware binding provided by the PUF to affect the MAC result, also making any reverse engineering more difficult as the MAC now depends not only on the code that may be monitored when it is loaded into the target processor, but also on a non-volatile secret that is inherent to the target processor itself and is never exposed to the adversary.

The MAC (e.g., CBC-MAC) is preferably computed over all the code that has been loaded, including all that which has been executed from the moment reset was released, and that which is currently executing (i.e., calculating the MAC response value), and that which will shortly be executed, assuming the penalty is not imposed to prevent it. In some cases it may be impossible, due to the limitations of the target processor, to read all the code which was loaded. In those cases, it is still preferable to compute the MAC over as much of the code as is feasible. In some processors it may not be possible to read the code that is currently executing. In most of these cases it is possible to observe code as it is being loaded, instead. Though this is not quite as secure as measuring the code after it has been loaded into SRAM or configuration memory where it is executed from, it still significantly raises the assurance that the authentic code has been loaded and is being executed. The MAC calculation preferably also includes the nonce, so that the correct result is different on each boot attempt. Only if all this code is exactly as it should be will the response (i.e., the MAC tag) that is calculated be correct. A parallel calculation is performed by the root of trust chip using the same source data. However, persons of ordinary skill in the art will observe that the WhiteboxCRYPTO™ implementation is not required in the root of trust chip; a conventional AES implementation may be used to calculate the same result using fewer resources. Unlike the obfuscated key transmitted to the target processor over what is assumed to be an all-too-public channel, the plaintext secret key is not exposed by the root of trust chip due to its other security features, such as protected access via passcodes and other security countermeasures. The root of trust chip cannot just store a pre-computed MAC tag result since the nonce ensures that the correct response will be different each time the process is repeated, so it has to run the computation essentially in parallel with the target processor.

A number of enhancements of the basic scheme are possible to enhance security further. For example, the response can be required to be returned within a narrow time window, helping to ensure that it was computed by the target processor and not some sort of off-line processor that can also run the MAC algorithm and get the correct response. In this case, the clocks could also be monitored for tampering, such as where the adversary stalls the clock to buy more time to replicate the calculation. It can be required that the response be sent at a single identified clock cycle to prevent adversaries from employing such techniques without detection.

Another enhancement is to provide some binding between the various hardware chips used, such as a SmartFusion®2 SoC FPGA, available from Microsemi CoC Corporation of San Jose, Calif., and the target processor. This could be as simple as registering a chip serial number from the target processor with the SmartFusion®2 SoC FPGA, assuming that the serial number is software readable in the target processor. An even more preferable way to provide binding between the various hardware chips used is based on physically unclonable functions (PUFs), which are like fingerprints of the integrated circuits that are not nearly as easy to forge as a public serial number. Many methods for creating unique-per-device PUFs are known in the art, including those based on memory start-up values and those based on circuit delays, amongst others. The PUF circuit may provide information that can be used to identify the integrated circuit it is part of, or it may be used to generate a repeatable secret key. PUFs may have a large number of responses corresponding to a large number of input challenges, or just one challenge and response; and either type may be utilized in conjunction with the invention. During the original manufacturing process, the chips are paired during an enrollment process. One result of enrollment is that some data unique to the PUF on the target processor is generated and stored for later use in identifying the target device in future operations, or for reliably [re-]generating a repeatable secret key in the future. This data is stored in persistent (non-volatile) memory somewhere in the system. In one embodiment, this data, often referred to as "helper data" by PUF practitioners, is stored in the eNVM of the SmartFusion®2 SoC FPGA devices. In various embodiments, the PUF result is used to affect the result of the MAC calculation, or is used in an additional identity check (versus the check of the MAC response). It is generally required to keep some of the PUF data confidential so the adversary cannot forge the PUF response. Keeping the helper data confidential may not be required (depending on the PUF algorithm used), but doing so may help improve the security strength. The identification algorithm may be executed primarily on the target processor or primarily on the secure root of trust device, depending on where the PUF raw data and the helper data are combined. In either case, this pairing makes it very difficult to later substitute another target processor (or secure SoC FPGA) in place of the one that was paired, since only the helper data stored and used in the identification or key regeneration process will give a correct identification or key regeneration result when used with the PUF that is part of the authentic target processor device, thus preventing relay types of attacks such as where the adversary uses another chip of the same type as the target processor to attempt to calculate the correct response from the nonce and the authentic code, while at the same time feeding the target chip malicious code to execute. Note that the PUF and the associated helper data is different in each instance of the system containing the target processor, thus neither can be independently moved or copied in an attempt to clone a system.

Though a symmetric key approach has been described, similar results can be obtained with asymmetric cryptographic methods. For example, there is a version of WhiteboxCRYPTO that implements the Rivest-Shamir-Adelman (RSA) public key algorithm, hiding an RSA private key using strong obfuscation. In this variation, digital signatures may take the place of the CBC-MAC tag in the challenge-response protocol that authenticates the code uploaded and running on the target processor. The root of trust uses both the public key associated with the private key that was used by the target processor to generate the signature and the boot code served to the target processor.

Although authentication of the code, including proving its integrity, is the primary security objective, there may be cases where confidentiality is also desirable. Except for some of the earliest boot code that is delivered which must be in plaintext form in order for the unsecure target processor to execute it, it is possible to enhance the current scheme with encryption, either using the secret key delivered by a key obfuscation technique or by establishing a second key using hybrid public key methods using the now-trusted code executing on the target processor, along with a process running on the root of trust chip. For large amounts of boot and application code (which is the norm rather than the exception), most of the code (beyond that stored in the on-chip NVM of the secure chip) can be stored in external non-volatile memory chips, such as an SPI PROM, and can be encrypted as well as authenticated. The external memory chip could also be cryptographically bound to the root of trust chip and/or the target processor using classical cryptographic methods, or one of the more modern PUF approaches. For example, the PROM on each system could be encrypted with a different secret key, preventing the PROM from one system being used on any other. If the secret key is based on a PUF of one of the other devices in the system, the binding is especially strong and virtually unforgeable.

Anti-tamper defenses are usually applied in multiple layers. In conjunction with the present invention, additional tamper detectors and penalties can and should be provided, as appropriate for the value of the assets being protected and the threat environment. These could include, for example, monitoring of other inputs to the target processor. Access to select target processor pins, the JTAG pins for example, could be limited, with input signals controlled and monitored by the root of trust chip. Critical signals, like reset and the JTAG signals, could be protected by tamper detectors like an anti-tamper mesh designed into the circuit board around those signals. Severing of the anti-tamper mesh in an attempt to access these critical signals is detected and triggers application of one or more penalties. In higher-security applications there may be protection of the entire three-dimensional volume occupied by the circuits using a tamper-detecting enclosure. Use of the SmartFusion®2 FPGA as a security chip provides a very good vehicle for implementing many of these layered tamper detection schemes, as well as an ideal place for implementing penalties. It can be very tightly integrated with other circuit board functions like power sequencing, input-output functions, and encryption that make bypassing it very difficult. If the secure root of trust device is not essential to the operation of the system, the adversary may defeat the secure boot implementation by just removing it from the system and forging any signals, such as the target processor reset, that it was generating. When the root of trust chip is essential for many aspects of the operation of the overall system, especially if some complex operations or operations based on secrets are included, then it becomes much harder for the adversary to bypass it since these complex or secret operations would also need to be forged.

The present invention can be implemented with either a more hardware-centric approach such as simple logic state machines, or using a processor and firmware. In certain embodiments, utilizing a SmartFusion®2 FPGA as an exemplary root of trust chip, the internal ARM® Cortex®-M3 processor implements the main control functions; and in other embodiments the Cortex®-M3 is not utilized. Persons of ordinary skill in the art will appreciate that other security chips including other processors may be used to implement the present invention.

The present invention thus allows the use of target processors that do not have intrinsic secure boot features, such as immutable boot code and keys, in applications requiring a higher level of assurance that the boot process has not been subverted. Also, the invention can be used to make cloning of the user system more difficult by binding the various chips together and by keeping the code confidential. Keeping the code confidential also frustrates a search by an adversary for any potential security vulnerabilities he might discover if he could more easily analyze the code; this might be a more important justification for code encryption in many security applications than the threat of code theft for economic gain.

Figure 3:
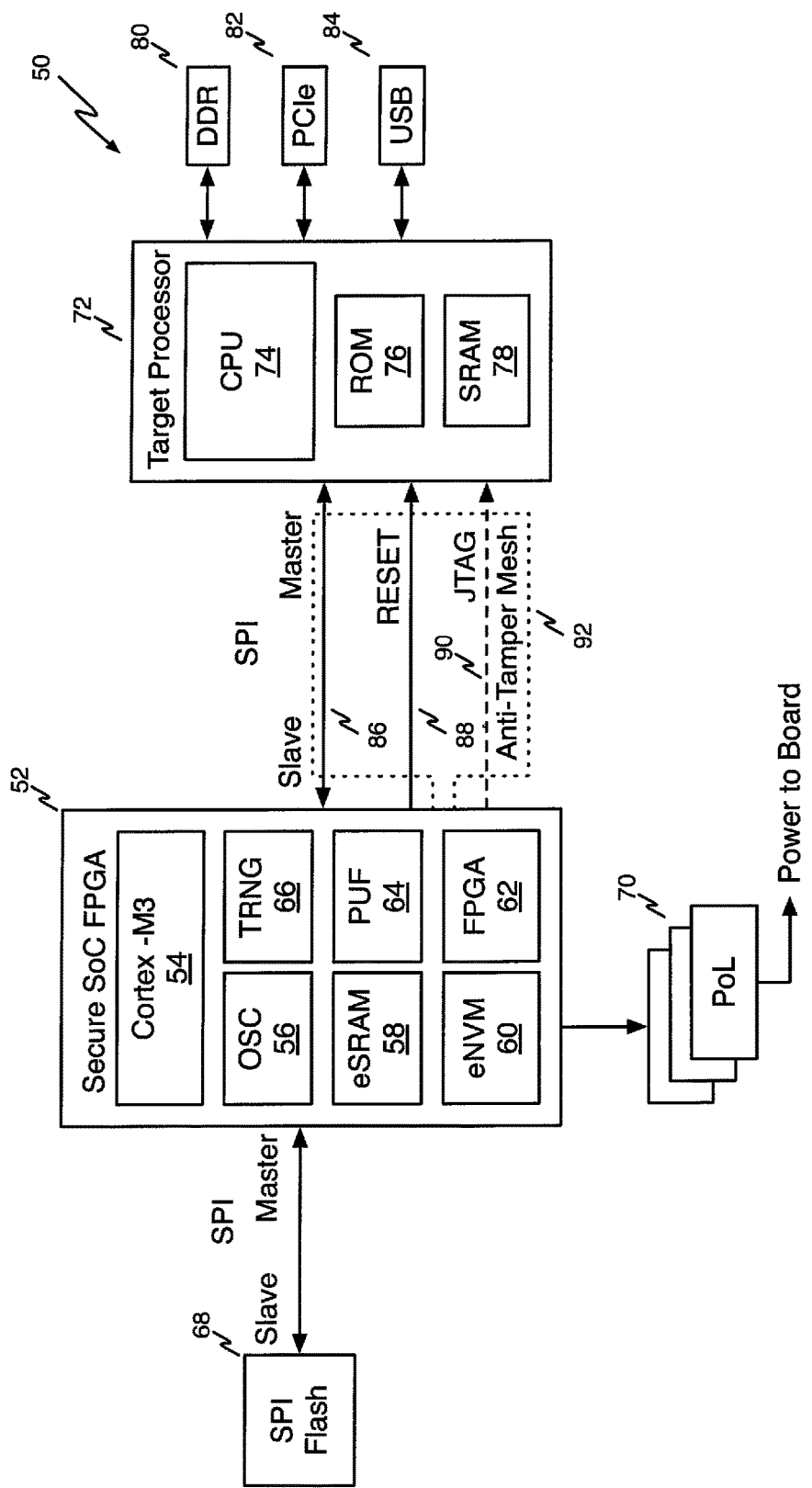
FIG. 3 is a block diagram of an illustrative secure boot system for booting an unsecure processor in accordance with one aspect of the present invention.

Referring now to FIG. 3 a block diagram shows an illustrative secure boot system 50 for booting an unsecure processor in accordance with one aspect of the present invention. In the non-limiting exemplary embodiment disclosed herein, secure boot system 50 is built around a secure system-on-a-chip (SoC) field programmable gate array (FPGA) 52.

Secure SoC FPGA 52 includes an internal processor 54 such as a Cortex®-M3 processor or another processor with similar capabilities, as is well known in the art. An on-chip oscillator 56 provides a secure clock source for the FPGA and its internal security functions, as well as perhaps for use by the Cortex®-M3 subsystem. Secure SoC FPGA 52 also includes embedded SRAM memory array (eSRAM) 58, eNVM non-volatile memory array 60, and FPGA core 62.

Secure SoC FPGA 52 also includes a physically unclonable function (PUF) unit 64 which can provide strong identification capability for the SoC FPGA chip as well as secure key storage, and a true (i.e., non-deterministic) random number generator (TRNG) 66 provides a source of entropy for generating keys and nonces. Secure SoC FPGA 52 is coupled to one or more point-of-load (PoL) power supply units 70 that it can turn off in case a penalty needs to be applied. Secure SoC FPGA 52 is also coupled to SPI flash memory 68 that holds code that is not stored directly in the on-chip eNVM 60.

Secure SoC FPGA 52 is used to boot load an exemplary target processor 72. As known by persons of ordinary skill in the art, target processor 72 includes a CPU 74 that executes code (e.g., firmware or software instructions), a ROM 76, and SRAM 78. Target processor 72 is coupled to DDR memory 80, an external bus, such as PCIe bus 82 and USB bus 84, as is known in the art.

The target processor 72 is coupled to the Secure SoC FPGA 52 over a bus, such as an SPI bus 86. The SPI bus 86 is illustrative of a typical bus the processor may initially fetch boot code with. Different processors may offer alternative bus architectures. For example, an FPGA may boot over a JTAG serial bus, while another processor may boot over a parallel type of bus. The system designer may choose what type of bus is used based on the processor options and other system considerations. One advantage of using an FPGA as the secure element is that it can easily adapt to whichever bus architecture is most suitable in a given system. A reset signal is provided to the target processor 72 by Secure SoC FPGA 52 over reset line 88. Information is sent to the target processor over a communications line such as JTAG bus 90. In this type of arrangement, the JTAG system inputs can be filtered by the secure SoC FPGA to protect the target processor from external port type attacks.

Because the Secure SoC FPGA 52 is physically separated from the target processor 72, a security measure, such as an anti-tamper mesh 92, is provided to secure critical signals such as, but not limited to, the SPI, reset, and JTAG connections between Secure SoC FPGA 52 and the target processor 72. Persons of ordinary skill in the art are familiar with security features, such as anti-tamper mesh 92, which sends a signal to Secure SoC FPGA 52 if anyone attempts to access the protected signal lines. Secure SoC FPGA 52 can respond by applying any number of penalties, such as interrupting power to the system, erasing memory contents, and, in extreme cases, even physically destroying critical components in the system.

Figure 4:
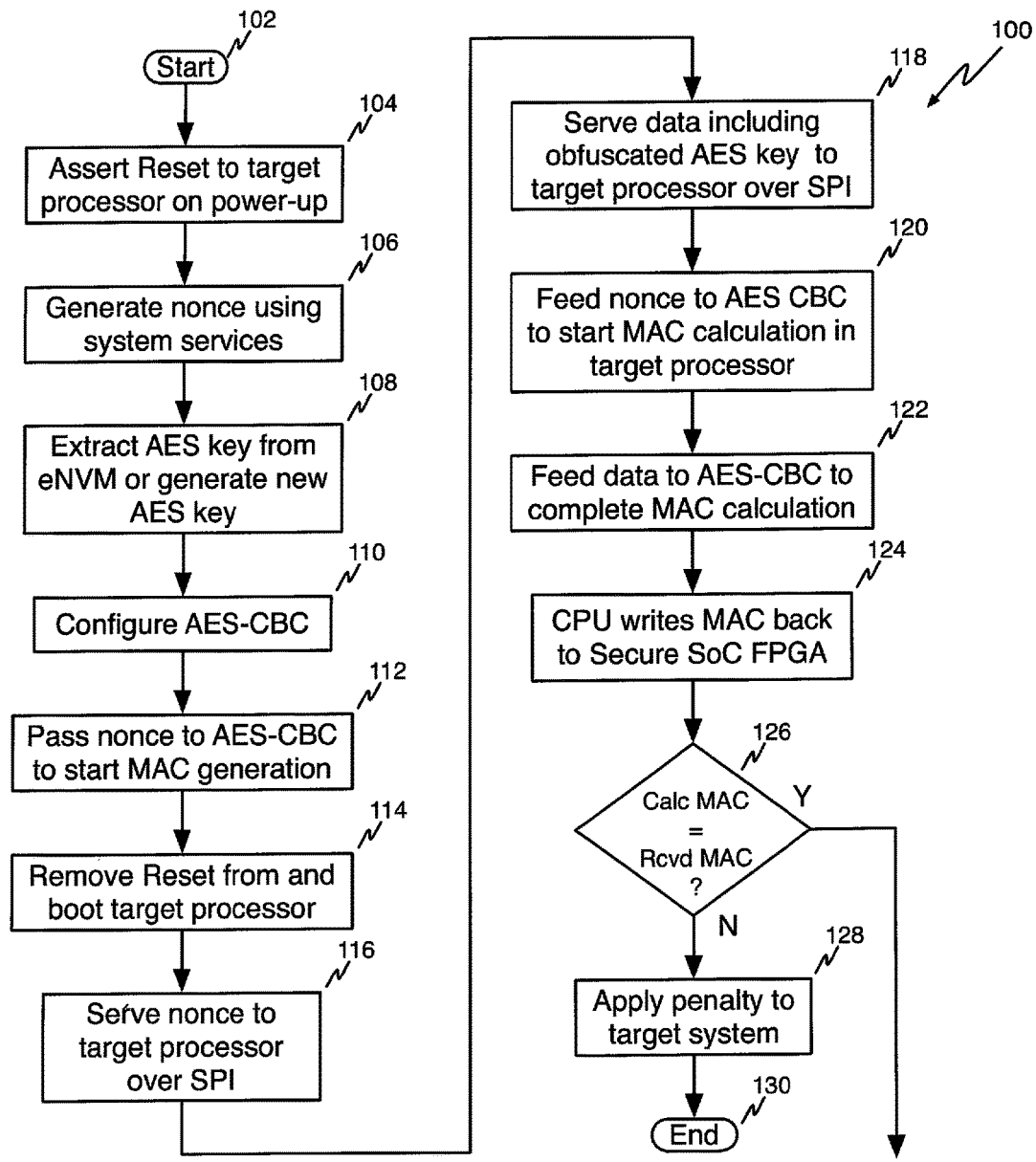
FIGS. 4 and 5 are flow diagrams that together show an illustrative secure Phase-0 boot process according to the present invention.
Figure 5:
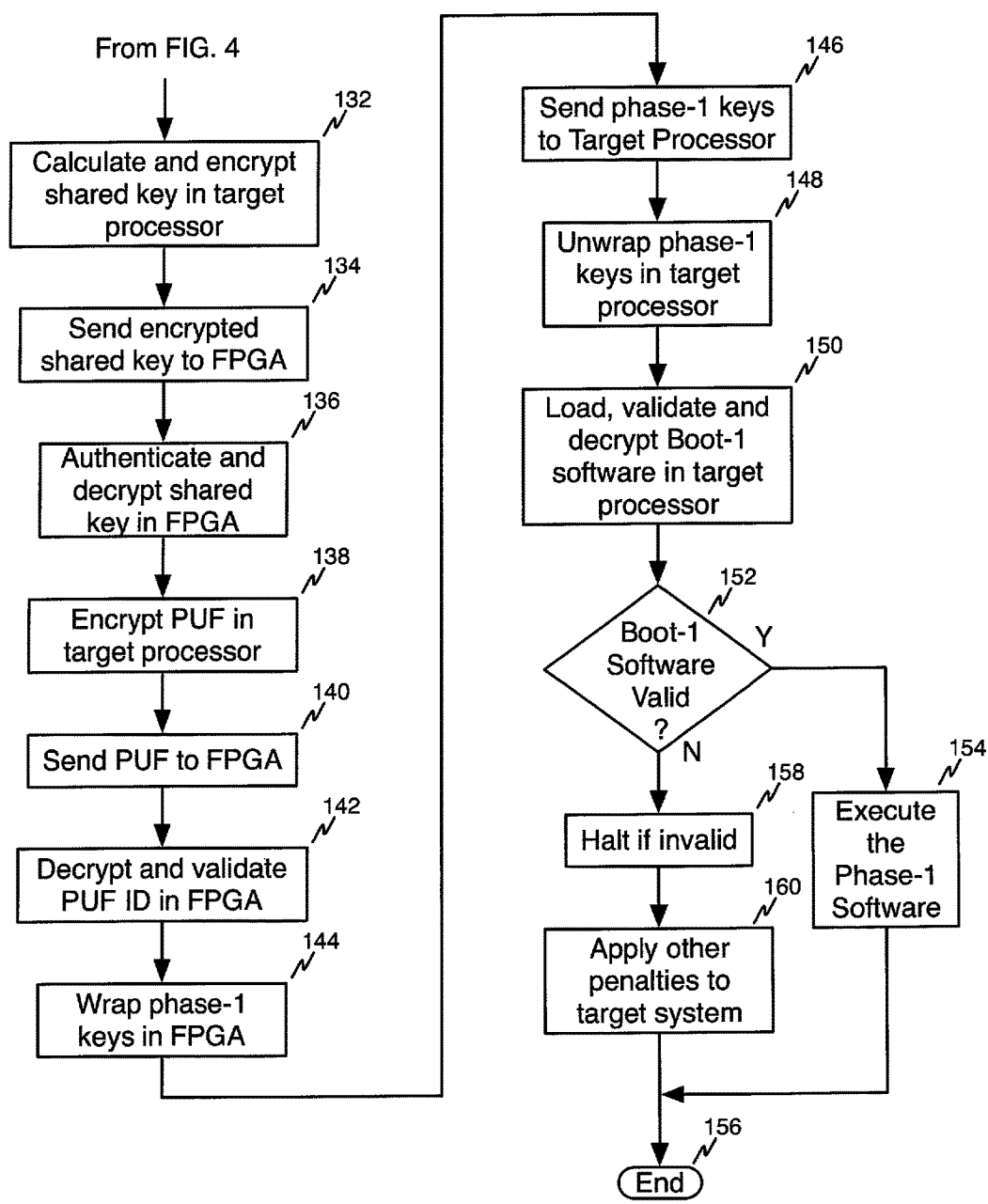

Referring now to FIGS. 4 and 5, flow diagrams that together show an illustrative secure Phase-0 boot process 100 according to the present invention. The process starts at reference numeral 102.

At reference numeral 104, on system power-up, the Secure SoC FPGA 52 asserts a reset signal to the target processor 72 over reset line 88 (FIG. 3). At reference numeral 106, the Secure SoC FPGA 52 generates a nonce using its internal TRNG 66. At reference numeral 108, the Secure SoC FPGA 52 either fetches an AES key from eNVM 60 or generates a new AES key using the TRNG 66, or some deterministic method. At reference numeral 110, the AES-based CBC-MAC algorithm is configured in the Secure SoC FPGA 52 by initializing it with an initialization vector (IV) with a value of zero, as per the CBC-MAC standard. At reference numeral 112, the nonce generated at reference numeral 106 is passed to the AES-based CBC-MAC to begin generation of a unique message authentication code (MAC) tag. At reference numeral 114, the reset signal is removed from the target processor 72 and the boot process of the target process is begun by feeding the target processor its initial boot code from the secure eNVM 60, via the SPI bus 86 with the Secure SoC FPGA 52 emulating an SPI NVM device.

At reference numeral 116, the nonce is served by the Secure SoC FPGA 52 to the target processor 72 over the SPI bus 86. At reference numeral 118, code and data including an AES-based implementation of the CBC-MAC algorithm and an obfuscated AES key is served to the target processor over the SPI bus 86. As previously noted, the AES key may be obfuscated using a methodology, such as Whitebox-CRYPTO™. Other data that is used in the boot protocol and needing authentication, for example, an RSA public key used in key establishment, is also uploaded to the target processor.

At reference numeral 120, the nonce is fed to the AES-based CBC-MAC algorithm in the target processor after it is initialized to start calculating the MAC tag. At reference numeral 122, all the uploaded code and data including, without limitation, the AES-based CBC-MAC algorithm, the obfuscated AES key and the RSA public key is fed to the AES-based CBC-MAC algorithm running on the target processor to complete the MAC calculation, which recreates the same MAC tag as was computed in the Secure SoC FPGA. After it completes the MAC calculation, the target processor writes the calculated MAC tag back to the Secure SoC FPGA 52 via the SPI bus 86 or a side-channel interface, as shown at reference numeral 124.

At reference numeral 126, the Secure SoC FPGA 52 compares the recreated MAC tag received from the target processor 72 with the MAC it previously generated internally. If the two MAC values are the same, the process continues to the procedures shown in FIG. 5. If the two MAC values are not the same, a penalty is applied to the target system at reference numeral 128 and the process ends at reference numeral 130. As previously noted, the penalty may be any one or more of a variety of penalties. The process followed up to this point, assuming the MAC tags matched, provides a reasonably high level of assurance that the target processor has received the authentic code and data (such as the correct RSA public key), and that it is this authentic code that is currently being executed. If the code had been tampered with, it is highly unlikely the MAC tag returned by the target processor would have matched that computed inside the Secure SoC FPGA. The assurance is further improved if the MAC tag was received from the target processor at the expected time.

Referring now to FIG. 5, an ephemeral shared key is generated by and encrypted in the target processor 72 at reference numeral 132. This may be done by any suitable key generation method, for example, a true random number generator, whose implementation was uploaded as part of the boot code. The exact implementation of the key generation algorithm will depend greatly on the capabilities of the target processor. For example, in a microcontroller there may be uninitialized SRAM that can provide sufficient entropy for generating a high quality key, whereas in an FPGA a ring-oscillator based entropy source may be preferred. In one embodiment, the target processor 72 encrypts the ephemeral shared key using the RSA public key, and tags the message using the obfuscated AES key. At reference numeral 134, the target processor 72 sends the encrypted shared key to the Secure SoC FPGA 52. At reference numeral 136, the shared key is authenticated using AES and decrypted using the RSA private key in the Secure SoC FPGA 52. At this point, both the Secure SoC FPGA 52 and the target processor 72 share a secret symmetric session key.

At reference numeral 138, the target processor 72 encrypts the identity data provided by the PUF, which is like a fingerprint of the target processor, and at reference numeral 140, the target processor 72 sends the encrypted PUF data to the Secure SoC FPGA 52. At reference numeral 142, the PUF identity data is decrypted and validated in the Secure SoC FPGA 52. Thus, the Secure SoC FPGA can determine with a high level of assurance that the target processor is the exact same physical chip from which the PUF data was originally captured and stored within the Secure SoC FPGA during a one-time enrollment phase executed when the system was first assembled. If the Secure SoC FPGA determines that the chip it is communicating with is not the same physical chip that was enrolled, i.e., that it may be a counterfeit or imposter chip, for example, as part of a relay attack, then it can shut down the boot process and apply any penalties that are available to it. In an alternative embodiment, the PUF may generate a key which is used in the CBC-MAC calculation above, thus rendering the computed MAC tag invalid if the PUF key-regeneration algorithm is executed on a different physical device than the one originally enrolled.

At reference numeral 144, the static long-term Phase-1 keys that were used to authenticate and optionally encrypt the Phase-1 code stored in the SPI NVM memory 68 are wrapped (i.e., encrypted) in the Secure SoC FPGA 52 using the ephemeral shared key and at reference numeral 146, the Phase-1 keys are sent to the target processor 72. At reference numeral 148, the Phase-1 keys are unwrapped (i.e., authenticated and decrypted) in the target processor 72 using the ephemeral shared key. At reference numeral 150, the Phase-1 boot code from the SPI memory 68 is loaded via the Secure SoC FPGA 52 and the SPI bus 86 or other suitable interface, validated, and decrypted in the target processor 72 using the Phase-1 keys.

At reference numeral 152, if the Boot-1 software is valid (i.e., the authentication succeeded) the process is sent to reference numeral 154, where the Phase-1 software is executed. One common variation would be to withhold decrypting the data until after the result of the authentication is known to have succeeded. The process then ends at reference numeral 156.

If the Boot-1 software is not valid, the boot process is halted by the target processor at reference numeral 158. Next, at reference numeral 160, other penalties are applied to the target system by the Secure SoC FPGA 52 after it is informed or it recognizes that the boot process has halted on the target processor. The target processor may execute some system-level penalties or report its status, as implemented in the remaining authenticated Phase-0 boot code before it halts, but in any case it is unsafe to execute the Phase-1 boot code if it did not authenticate properly.

Figure 6:
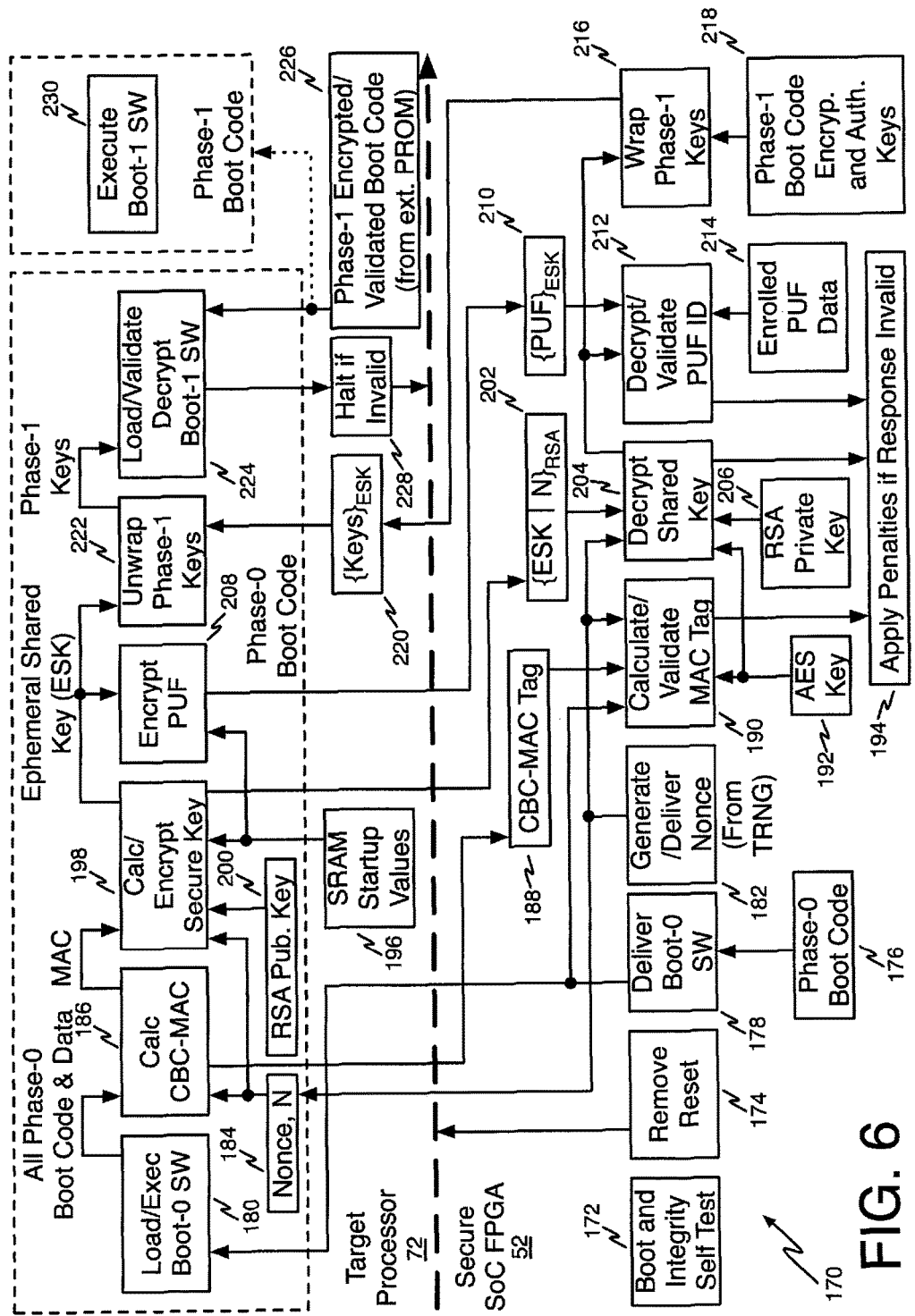
FIG. 6 is a diagram showing an illustrative secure boot process as well as the code (including data) transferred between the secure root of trust and the target processor.

Referring now to FIG. 6, a diagram shows the secure boot process in a different way. FIG. 6 shows an illustrative secure boot process 170 as operations occurring in the Secure SoC FPGA 52 and operations occurring in the target processor 72 above and below the dashed centerline in the figure, respectively, as well as the code (including data) transferred between the secure root of trust and the target processor. The execution of the operations on the Secure SoC FPGA and on the target processor flows from left to right. Connecting arrows from each box to the next indicating control flow have been omitted to improve the readability of the diagram. In this variation of the present invention, the PUF generates identity data enrolled with the Secure SoC FPGA at the time of manufacture that is verified each time the boot process is run, following the verification of the CBC-MAC tag. Reference numerals that identify the hardware elements are the reference numerals used in FIG. 3.

In preparation for the run-time process depicted in FIG. 6, the circuit board with the Secure SoC FPGA 52, SPI NVM memory 68, target processor 72, and other portions of the system are assembled. The Secure SoC FPGA 52 is configured with the program to execute the run-time steps per the invention as described in the following paragraphs in conjunction with FIG. 6. Included in this FPGA configuration is code 176 loaded into the eNVM 60 that will be transferred to the target processor 72 during the Phase-0 boot sequence, as described below. In the illustrative embodiment of FIG. 6, an instance of WhiteboxCRYPTO™ incorporating a randomly selected AES key which is pre-generated off-line is part of the pre-loaded Boot-0 code 176, as is the public key portion of an RSA key pair 200 that was also generated off line. A conventional form of the WhiteboxCRYPTO™ AES key 192 is stored in the Secure SoC FPGA's eNVM 60 and is available to the Secure SoC FPGA to use privately, but is not part of the Boot-0 code that is transferred to the target processor. Likewise, the private half of the RSA key pair 206 is stored in eNVM 60 for private use by the Secure SoC FPGA 52. If hardware binding of the target processor 72 is to be included in the secure boot process, as is shown in the method of FIG. 6, then PUF helper data 214 computed from measurements of the PUF in the target processor 72 is enrolled by storing it in the Secure SoC FPGA's eNVM 60. Encrypted code 226 for the target processor for the subsequent boot phases is pre-loaded into the SPI NVM memory 68. After these manufacturing assembly and configuration steps have been performed, then the system is ready to execute the run-time secure boot process per the invention, as shown in FIG. 6.

At power-on, the Secure SoC FPGA 52 boots itself securely from its internal immutable eNVM 60 after running its power-on integrity self-tests at reference numeral 172. Next, as shown at reference numeral 174, the Secure SoC FPGA 52 releases the reset 88 of the target processor 72 so it can start to boot.

The target processor 72 fetches the Phase-0 boot code (shown at reference numeral 176) from the Secure SoC FPGA 52 (as shown at reference numeral 178 from the secure SoC side and reference numeral 180 at the target processor side), which is now emulating a boot PROM coupled to the target processor 72. The code is placed in on-chip SRAM 78 as it is loaded in the target processor 72.

As shown at reference numeral 182, the Secure SoC FPGA 52 generates a random nonce using its non-deterministic random bit generator (TRNG) and delivers it to the target processor (shown at reference numeral 184) with the rest of the Boot-0 code.

While executing the boot code from on-chip SRAM 78, which contains a WhiteboxCRYPTO™ AES image hiding an obfuscated AES key, the target processor 72 at reference numeral 186 calculates a CBC-MAC over all the Phase-0 code in the SRAM 78 (including the nonce 184, the RSA public key 200, and including the code that is currently executing), and writes the resulting tag to the Secure SoC FPGA 52, as shown at reference numeral 188.

Largely in parallel with delivering the code, at reference numeral 190 the Secure SoC FPGA 52 calculates a CBC-MAC over all the same data that it sent to the target processor 72, using the "conventional" AES key (reference numeral 192) which it fetches from its eNVM 60. It compares the CBC-MAC tag received at reference numeral 188 from the target processor 72 with the one it calculated internally at reference numeral 190. If the CBC-MAC tag 188 from the target processor 72 does not arrive during a tight time window, or the two tags do not match, the Secure SoC FPGA 52 imposes penalties, such as resetting the target processor, shutting down power, disabling communication, etc., at reference numeral 194.

If the CBC-MAC tags match, at reference numeral 198 the target processor 72 reads a section (e.g., 4K bits) of an uninitialized portion of its SRAM, whose start-up values 196 will be used as a physically unclonable function (PUF) and to generate a key. At reference numeral 198, the start-up to start-up entropy of the SRAM (e.g., >200 noisy bits out of 4K bits shown at reference numeral 196) is compressed to generate an ephemeral shared symmetric key (ESK; e.g., 128 bits in length) by the target processor using an algorithm such as the WhiteboxCRYPTO™ CBC-MAC algorithm, including the MAC tag from reference numeral 186. This key and the nonce, N (up to a total number of bits equal to the RSA message block size) are double-encrypted using an algorithm such as WhiteboxCRYPTO™ AES and an RSA public key shown at reference numeral 200 that was delivered as part of the now-authenticated boot code, and is sent to the Secure SoC FPGA 52 as shown at reference numeral 202.

At reference numeral 204, the secure SoC FPGA 52 decrypts the ephemeral shared key (ESK) using the corresponding RSA private key (shown at reference numeral 206) and the conventional AES key (shown at reference numeral 192), both of which are fetched from its eNVM 60, and checks that the (partial) nonce is correct to authenticate the message. If not, penalties are imposed at reference numeral 194 as it may be suspected that the ESK has been tampered with or a different RSA public key has been used (or both).

At reference numeral 208, the 4K bit current state of the SRAM PUF after start-up 196 is encrypted using the ephemeral shared key and sent to the Secure SoC FPGA 52. It is expected that the current start-up value of the SRAM bits is similar to the start-up bits that were enrolled during the manufacturing time. The encrypted PUF data is sent to the secure SoC processor at reference numeral 210.

At reference numeral 212, the Secure SoC FPGA 52 decrypts the current PUF data and compares it to a snapshot 214 taken during an enrollment process run when the circuit boards were first built. The number of matching bits (a.k.a., the complement of the Hamming distance) must fall within a certain window (e.g., 70-99%), proving the target processor 72 is the same exact chip as was enrolled, or else penalties are imposed at reference numeral 194. If the target processor chip 72 is different than the one enrolled, it is expected that the Hamming distance will be nearer to 50%, and the percentage of matching bits will be below the minimum identification detection threshold, thus indicating a counterfeit (i.e., physically different) chip. A Hamming distance that is too close to zero (i.e., nearly 100% matching bits) may indicate tampering or reduced entropy, and can also be flagged as a failure.

The decrypted ephemeral shared key from reference numeral 204 is used at reference numeral 216 as a session key to wrap the static encryption and authentication keys from reference numeral 218 used when the Phase-1 code was originally compiled, encrypted, validated, and stored in an external SPI NVM memory 68 used with all of the boards in the project. The wrapped keys are delivered to the target processor 72 at reference numeral 220. In an alternate implementation, the static keys could be different for each instance of the PROM, binding each PROM more tightly to the one system for which it is intended.

At reference numeral 222, the target processor 72 unwraps the authentication and encryption keys (which are preferably different from each other and from the WhiteboxCRYPTO™ AES key) by authenticating and decrypting them. Methods of wrapping keys to provide for their confidentiality and authenticity during transport are well known, for example, the National Institute of Standards and Technology key wrap algorithm. Likewise, methods to perform key wrapping and unwrapping that also provide resistance to side-channel monitoring attacks are well known by those skilled in the art.

At reference numeral 224, the target processor 72 loads a Phase-1 boot code 226 from the external SPI NVM memory 68 directly (or via the Secure SoC FPGA 52), stores it temporarily in on-chip SRAM 78, and checks the validity of the attached MAC tag using the authentication key (in first pass over the code). As already pointed out, alternative well-known methods of authentication are possible, such as a digital signature that is validated using a trusted public key. In this exemplary process, symmetric methods are preferentially used due to their lower computational demands. Only one costly asymmetric cryptographic computation is needed from the target processor 72 (the RSA encryption at reference numeral 198), and one from the Secure SoC FPGA 52 (the RSA decryption at reference numeral 204).

If the attached MAC tag is not valid, at reference numeral 228 the processor halts and perhaps causes other penalties to be applied (e.g., by a watchdog timer in the Secure SoC FPGA that triggers when no response comes back from the target processor, indicating to the Secure SoC FPGA that the target processor has halted).

If valid, the Phase-1 code is read from the temporary SRAM image, decrypted (in the second pass over the code) with the resulting plaintext stored in internal SRAM 78 and executed at reference numeral 230. The multi-stage boot continues, with the Secure SoC FPGA 52 monitoring the process wherever it can. For example, the Phase-1 code could generate a cryptographically-secure heartbeat by encrypting a constantly updated counter with ESK that is required to be received by the Secure SoC FPGA 52 at regular intervals. The code for Phases 1 through n is validated by an already-trusted system before execution is transferred to it. This process establishes a chain of trust all the way to the top application layer.

One advantage of the proposed approach is its universality. Very little modification of existing boot loaders, BIOS systems, or operating systems needs to be performed in order to use the present invention. Thus, an organization that is supporting multiple processor systems can deploy the invention widely without a large investment in adapting it to each individual application. This universality also applies to processors like DSPs and GPUs that normally are not considered to be secure boot candidates, but which in some higher security applications, especially in military applications, can be important in the security of the overall system.

Persons of ordinary skill in the art will appreciate that the disclosure uses RSA encryption and digital signatures, AES encryption, AES-based CBC-MAC authentication, and whitebox cryptography key obfuscation as non-limiting examples, and that other equivalent cryptographic techniques may be employed in implementing the present invention.

Although the above provides a full and complete disclosure of the preferred embodiments of the invention, various modifications, alternate constructions and equivalents will occur to those skilled in the art. Therefore, the above should not be construed as limiting the invention, which is defined by the claims.

The invention claimed is:

1. A method for securely booting a target processor in a target system from a secure root of trust comprising:
   computing in the secure root of trust a message authentication code from boot code to be provided to the target processor, the boot code including an obfuscated algorithm for recreating the message authentication code in the target processor;
   serving the boot code to the target processor;
   commencing execution of the boot code in the target processor to recreate the message authentication code in the target processor using the received boot code as input;
   serving the recreated message authentication code from the target processor back to the root of trust;
   comparing in the root of trust the returned message authentication code with the message authentication code generated in the root of trust;
   continuing execution of the boot code in the target processor if the returned message authentication code matches the message authentication code generated in the root of trust; and applying at least one penalty to the target system if the returned message authentication code does not match the message authentication code generated in the root of trust.

2. The method of claim 1 wherein the at least one penalty comprises halting execution of the boot code in the target processor.

3. The method of claim 1 wherein the at least one penalty comprises stopping at least one clock in the target system.

4. The method of claim 1 wherein the at least one penalty comprises interrupting power to at least a part of the target system.

5. The method of claim 1 wherein the at least one penalty comprises erasing contents of at least some memory in the target system.

6. The method of claim 1 wherein the at least one penalty comprises permanently disabling at least a portion of the target system.

7. The method of claim 1 wherein the target processor comprises a field programmable gate array.

8. The method of claim 1 wherein the target processor comprises a processor capable of executing instructions.

9. The method of claim 1 wherein the root of trust comprises a field programmable gate array.

10. The method of claim 1 wherein the target processor is an integrated circuit.

11. The method of claim 1 wherein the boot code contains a public key used by the target processor to establish a session key shared by the target processor and the secure root of trust.

12. The method of claim 1 further comprising:
combining data from a physically unclonable function in the target processor with enrollment data stored in the root of trust device; and
using the combined data to verify that the target processor is the same physical device that was used to create the enrollment data.

13. The method of claim 1 wherein continuing execution of the boot code comprises authenticating a next phase boot code using a cryptographic variable authenticated by the recreated message authentication code.

14. The method of claim 1 wherein including an obfuscated algorithm for recreating the message authentication code in the target processor comprises including an algorithm that computes a message authentication code using whitebox cryptography techniques.

15. The method of claim 1 wherein the message authentication code algorithm used is CBC-MAC.

16. The method of claim 1 wherein at least one secret value is protected by at least one countermeasure against extraction by side channel monitoring attacks.

17. The method of claim 13 wherein the cryptographic variable is protected by at least countermeasure against extraction by side channel monitoring attacks.

18. A method for securely booting a target processor in a target system from a secure root of trust comprising:
serving boot code to the target processor, the boot code including an algorithm and an obfuscated private key for creating a digital signature in the target processor;
commencing execution of the boot code in the target processor to create a digital signature in the target processor using the received boot code as input;
serving the digital signature from the target processor back to the root of trust;
verifying in the root of trust the returned digital signature generated in the target processor, the root of trust using both a public key associated with the private key that was used by the target processor to generate the signature and the boot code served to the target processor;
continuing execution of the boot code in the target processor if the returned digital signature generated in the target processor is valid; and
applying at least one penalty to the target system if the returned digital signature generated in the root of trust is invalid.

* * * * *